US008966370B2

(12) United States Patent
Steiner

(10) Patent No.: US 8,966,370 B2
(45) Date of Patent: Feb. 24, 2015

(54) DYNAMIC ADJUSTMENT OF VIDEO QUALITY

(75) Inventor: Thomas Steiner, Hamburg (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/601,149

(22) Filed: Aug. 31, 2012

(65) Prior Publication Data

US 2014/0068436 A1 Mar. 6, 2014

(51) Int. Cl.
*G11B 27/34* (2006.01)
*G06F 3/00* (2006.01)

(52) U.S. Cl.
USPC ............................ 715/719; 709/203; 709/231

(58) Field of Classification Search
None
See application file for complete search history.

(56) References Cited

U.S. PATENT DOCUMENTS 7,523,409 B2 * 4/2009 Yolleck et al. ................ 715/777
7,917,773 B2 * 3/2011 Xu et al. ....................... 713/300
8,250,228 B1 * 8/2012 Johansson ..................... 709/231
8,250,478 B2 * 8/2012 Dharmarajan et al. ....... 715/760
8,468,426 B2 * 6/2013 Bims ............................ 714/774
2003/0052911 A1 * 3/2003 Cohen-solal .................. 345/738
2004/0201608 A1 * 10/2004 Ma et al. ....................... 345/719
2008/0276248 A1 * 11/2008 Xu et al. ....................... 719/313
2008/0288876 A1 * 11/2008 Fleming ........................ 715/761
2009/0119329 A1 * 5/2009 Kwon et al. .................. 707/102
2009/0144648 A1 * 6/2009 Oskooi ......................... 715/777
2012/0224043 A1 * 9/2012 Tsurumi ........................ 348/78
2012/0291053 A1 * 11/2012 Carter et al. .................. 719/328
2012/0307890 A1 * 12/2012 Lu et al. .................. 375/240.03
2012/0331406 A1 * 12/2012 Baird et al. ................... 715/760
2013/0287023 A1 * 10/2013 Bims ............................ 370/389

OTHER PUBLICATIONS

Mann, Jatinder, Page Visibility, W3C Working Draft, Jun. 2, 2011.*
Google Developers, "Using the Page Visibility API", Mar. 30, 2012; retrieved Aug. 31, 2012 from https://developers.google.com/chrome/whitepapers/pagevisibility.
Search Report for PCT/US13/57707, mailed Sep. 24, 2013.
Written Opinion for PCT/US13/57707, mailed Sep. 24, 2013.

* cited by examiner

*Primary Examiner* — Stephen Alvesteffer
*Assistant Examiner* — Mahelet Shiberou
(74) *Attorney, Agent, or Firm* — Lowenstein Sandler LLP

(57) ABSTRACT

A video quality module receives data indicating a visibility status of a tab of a web browser running on a user device. The video quality module determines, based on the data indicating the visibility status of the tab whether the tab of the web browser is currently visible to a user of the user device, the tab of the web browser comprising a streaming media player. If the tab of the web browser is not currently visible to the user, the video quality module decreases a quality of a video component of a streaming media file playing in the streaming media player.

21 Claims, 8 Drawing Sheets

DYNAMIC ADJUSTMENT OF VIDEO QUALITY

TECHNICAL FIELD

This disclosure relates to the field of streaming media and, in particular, to dynamic adjustment of video quality.

BACKGROUND

Streaming media is multimedia, such as video and audio content, which is received by and presented to an end-user while being delivered by a streaming provider. With streaming media, a client media player can start playing media content before the entire file has been transmitted from a server, e.g., over a telecommunications network. For example, a user may visit a media streaming website using a web browser running on a personal computing device. The user may play multimedia content, including video and audio portions, in a media player from the media streaming website. The streaming provider may transmit the audio and video portions of the content to the personal computing device over a network, such as the Internet, which may be played back in the media player.

Many users stream multimedia content, including video and audio components, to their personal computers. One example of the multimedia content is a music video. In many cases, however, a user may perform other tasks while the multimedia content is streaming, such as web browsing, using productivity applications, or other tasks. In these cases, the website containing the media player is minimized or shifted to the background and the user is effectively using the media player as a music only player. The video component of the multimedia content continues to stream to the user's computer, using considerable network bandwidth and resources, even though the video portion of the content is not being viewed by the user.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a video quality module receives data indicating a visibility status of a tab of a web browser running on a user device. Receiving the data may include sending a request for the visibility status of the tab using the Page Visibility Application Programming Interface (API) of the web browser. The video quality module determines, based on the data indicating the visibility status of the tab whether the tab of the web browser is currently visible to a user of the user device, the tab of the web browser comprising a streaming media player. In one implementation, the tab of the web browser includes a streaming media player playing a streaming media file from a web page. If the tab of the web browser is not currently visible to the user, the video quality module decreases a quality of a video component of a streaming media file playing in the streaming media player. The tab of the web browser is not visible to the user if the tab is in the background of the web browser, behind one or more other tabs. In addition, the video quality module may further halt a transmission of the video component of the streaming media file to the user device, while continuing to transmit an audio component of the streaming media file to the user device.

If the tab of web browser is currently visible to the user, the video quality module determines if the video component is currently decreased from a default setting. The tab of the web browser is visible to the user if the tab is in the foreground of the web browser. If the video component is currently decreased from the default setting, the video quality module increases the quality of the video component to the default setting. If the video component is not currently decreased from the default setting, the video component maintains a current quality of the video component.

BRIEF DESCRIPTION OF THE DRAWINGS

The present disclosure is illustrated by way of example, and not by way of limitation, in the figures of the accompanying drawings.

DETAILED DESCRIPTION

Implementations are described for dynamically adjusting a video quality of streaming media. In one implementation, a user requests that multimedia content, including video and audio components, be streamed to a personal computer or other user device. For example, the user may play a music video using a media streaming website accessed through a browser running on the user's computer. In many cases, however, the user may perform other tasks while the multimedia content is streaming. For example, if the browser is a tabbed browser, the user may open a new tab and view other web pages in the new tab. In this cases, the browser tab with the media streaming website is minimized or shifted to the background and the user is effectively using the media player as a music player, as the video component of the media is no longer visible. In one implementation, a visibility monitor running on the user's computer detects that the media player is no longer visible to the user due to the fact that the browser tab has been minimized or shifted to the background. For example, the browser may have an application programming interface (API), such as the Page Visibility API, which other devices can call to determine the visibility status of the tab containing the media player. While details are provided herein specifically relating to videos as an example for clarity of explanation, it shall be appreciated that such details may be equally applicable to other types of media, e.g., audio (e.g., music), images, documents, text (e.g., tweets), flash-content, etc., as applicable.

If, for example, the media server streaming the media content to the user's computer receives an indication from the visibility monitor that the user is not currently viewing the music video, the media server can dynamically adjust the quality of the streaming video component. In one implementation, the media server can decrease the quality of the video to a lower resolution. In another implementation, the media sever can halt streaming of the video component completely. In either case, the audio component of the streaming media may remain unchanged, so that the user can continue to hear the music video. Decreasing the quality or halting streaming of the video component can save network bandwidth and resources, allowing them to be used for other computing tasks. If the media server receives an indication from the visibility monitor that the tab containing the media player has been brought back to the foreground, the media server can increase the quality of the video or resume streaming of the halted video stream. This allows the user to maintain an enjoyable experience while consuming the media content.

Figure 1:
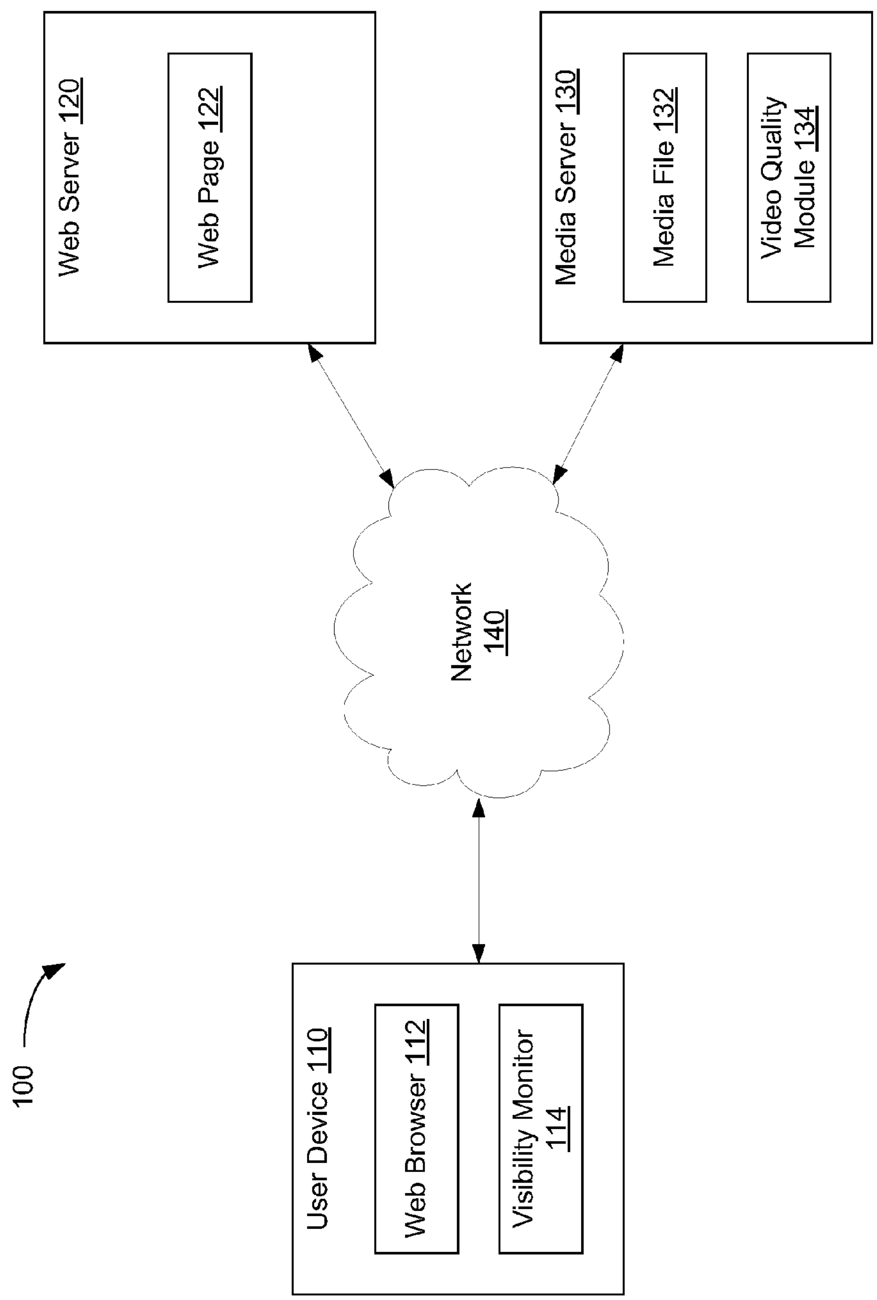
FIG. 1 is a block diagram illustrating an exemplary network architecture in which implementations of the present disclosure may be implemented.

FIG. 1 is a block diagram illustrating an exemplary network architecture in which implementations of the present disclosure may be implemented. The network architecture 100 can include one or more user devices 110 communicating with one or more servers, such as web server 120 and media server 130 over one or more networks 140, according to one implementation. Network 140 can be a local area network (LAN), a wireless network, a telephone network, a mobile communications network, a wide area network (WAN), such as the Internet, or similar communication system. User device 110 may be any type of computing device including a server computer, gateway computer, desktop computer, laptop computer, mobile communications device, cell phone, smart phone, hand-held computer, tablet computer, or similar computing device. User device 110 may be variously configured with different features to enable viewing of multimedia content, such as images, videos, songs, etc.

Web server 120 and media server 130 may include a network-accessible server-based functionality, various data stores, and/or other data processing equipment. The servers 120 and 130 may be implemented by a single machine or a cluster of machines. As illustrated in FIG. 1, web server 120 and media server 130 are separate devices. In another implementation, however, web server 120 and media server 130 may be combined into a single machine or device. One or both of web server 120 and media server 130 may be hosted, for example, by computer system 700 of FIG. 7. In one implementation, web server 120 hosts web page 122. Web server 120 can deliver web page 122 to user device 110 or another client device using for example the Hypertext Transfer Protocol (HTTP). Web page 122 may be part of, for example, a media content hosting website that allows users to upload, view and share, multimedia content.

In one implementation, media server 130 includes one or more media files 132 and video quality module 134. Media file 132 may represent the audio and video content that a user plays through web page 122. For example, when a user of user device 110 views web page 122, using a web browser 112 or other program running on user device 110, and requests to view a certain multimedia content, web server 120 can send a message to media server 130 requesting media file 132. Media server 130 can initiate streaming of media file 132 to user device 110 via network 140. In one implementation, media file 132 is a music video file, including both a visual and an audio component. In other implementations, however, media file 132 may be some other type of media file. In one implementation, user device 110 may additionally include visibility monitor 114. Visibility monitor 114 may determine if the user is actually viewing the streaming multimedia content at a given point in time based on a user's behavior with respect to the streaming media in web browser 112. Some implementations of visibility monitor 114 are discussed in more detail below.

Video quality module 134, running on media server 130, can receive an indication from visibility monitor 114 of whether the user us actually viewing the streaming media. In one implementation, based on the received indication, video quality module 134 can dynamically adjust the quality of the video portion of the streaming media to save bandwidth and other network resources. For example, if video quality module 134 receives an indication that the user is not viewing the streaming media (e.g., because a tab of web browser 112 used to view web page 122 has been minimized or shifted to the background in favor of another tab or application), video quality module 134 can optionally halt streaming the video component of the media or decrease a quality of the video stream to save bandwidth. An audio component of the media stream may continue to be transmitted to user device 110, so that if the user is still listening to the audio, the user's consumption is uninterrupted. Some implementations of video quality module 134 are discussed in more detail below.

Figure 2:
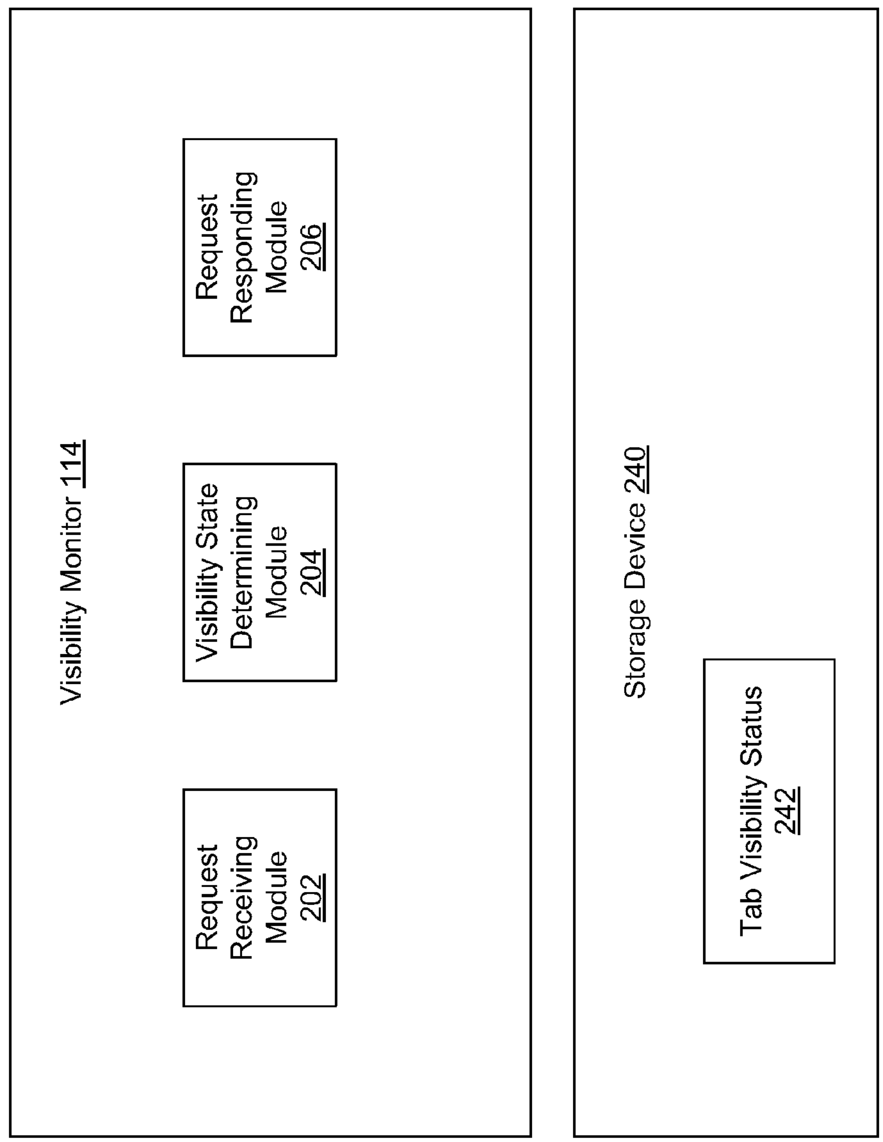
FIG. 2 is a block diagram illustrating a visibility monitor for detecting whether a user is currently viewing multimedia content, according to some implementations.

FIG. 2 is a block diagram illustrating a visibility monitor for detecting whether a user is currently viewing multimedia content, according to some implementations of the present disclosure. In one implementation, visibility monitor 114 includes request receiving module 202, visibility state determining module 204 and request responding module 206. This arrangement of modules may be a logical separation, and in other implementations, these modules or other components can be combined together or separated in further components, according to a particular implementation. In one implementation, storage device 240 is connected to visibility monitor 114 and includes tab visibility status 242. In one implementation, user device 110 may include visibility monitor 114 and storage device 240. In another implementation, storage device 240 may be external to user device 110 and may be connected to user device 110 over a network or other connection. In other implementations user device 110 may include different and/or additional components which are not shown to simplify the description. Storage device 240 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, request receiving module 202 receives requests, for example, from media server 130, for the visibility status of a particular tab of web browser 112. The request may identify the tab of web browser 112 in which a media player is running to which media server is currently, was previously, or is about to stream media content, such as media file 132. In one implementation, the request is in the form of an API call made, for example, to visibility monitor 114. In one implementation, visibility monitor 114 is the Page Visibility API. The Page Visibility API may be a standard interface that is included by a vendor of web browser 112. The Page Visibility API allows applications to request the visibility state of a document or web page being displayed by web browser 112. In other implementations, visibility monitor 114 may include some other API or specification. Upon receiving the request, request receiving module 202 may forward the request to, or otherwise notify, visibility state determining module 204 that the request has been received from media server 130. In other implementations, the request may be received from some other source besides media server 130.

Figure 3A:
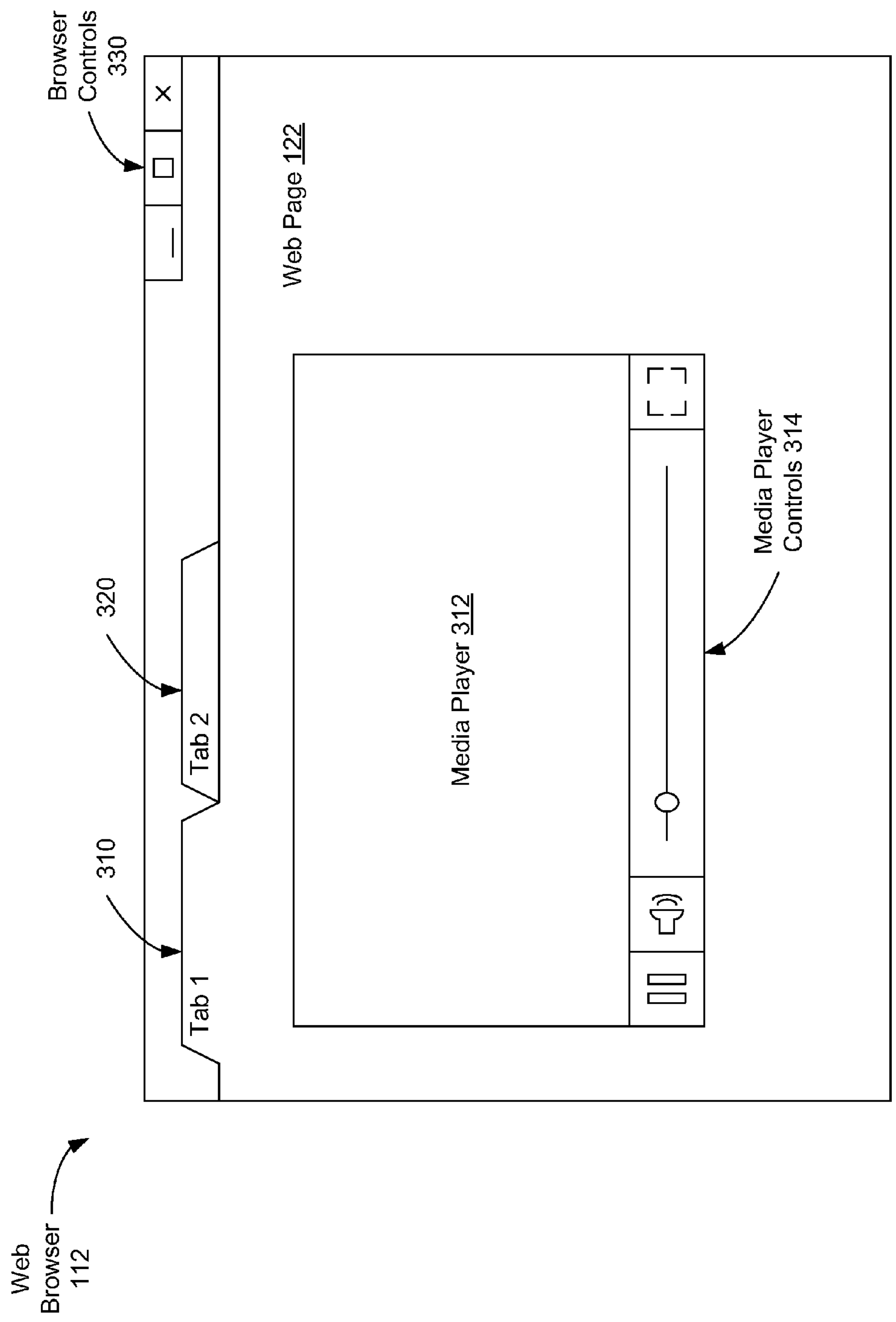
FIG. 3A is a diagram illustrating a tabbed web browser for viewing multimedia content, according to some implementations.

Visibility state determining module 204 can determine whether the requested tab of web browser 112 is currently visible to a user. FIG. 3A illustrates web browser 112, according to one implementation. In this implementation, web browser 112 includes one or more browsing tabs 310, 320 and browser controls 330. Browsing tabs 310 and 320 allow multiple web pages to be viewed in a single browser window. For example, browsing tab 310 may display web page 122 including media player 312. In one implementation, media player 312 may also include a set of controls 314 to control playback of media content. When the first browsing tab 310 is selected or activated, web page 122 may be visible to the user, assuming no other windows are placed on top of the window for web browser 112. Any additional tabs, such as browsing tab 320 are in the background, and the content displayed therein is generally not visible to the user. Visibility state determining module 204 can determine if browsing tab 310 (i.e., the tab containing web page 122 and media player 312) is currently selected, activated, or in the foreground of web browser 112. If so, visibility state determining module 204 can return a value of "visible" and store that value in an entry in tab visibility status information 242 corresponding to tab 310. If another browsing tab 320 were activated, and browsing tab 310 was in the background, visibility state determining module 204 can return a value of "hidden." In one implementation, visibility state determining module 204 checks the status of tabs 310 and 320 in response to receiving the request. In other implementations, however, visibility state determining module 204 can check the status of tabs 310 and 320 at periodic intervals or can update the status in tab visibility status information 242 each time the status changes. In these implementations, rather than checking the status of each tab, visibility state determining module 204 can just read the stored values from tab visibility status information 242.

Figure 3B:
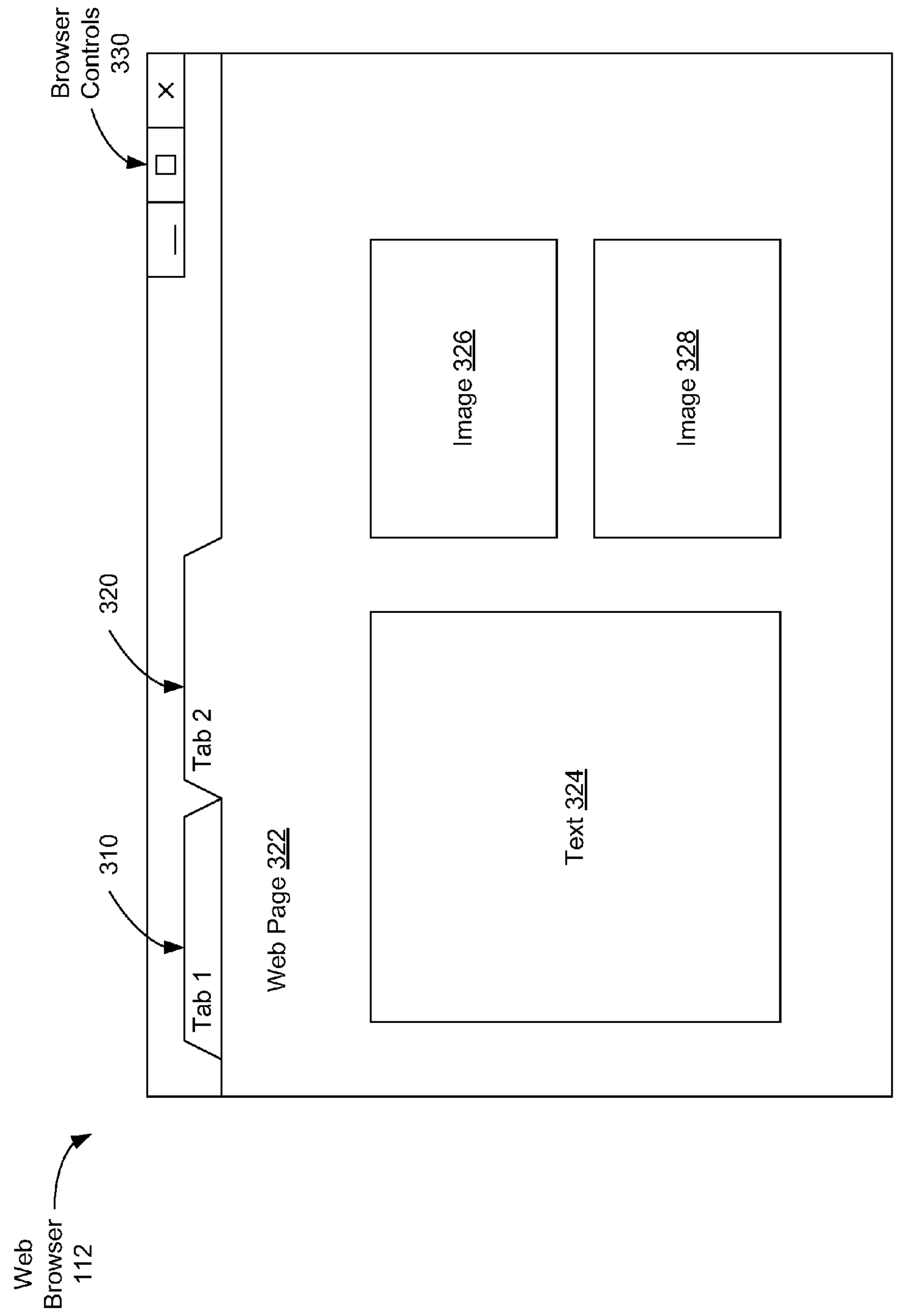
FIG. 3B is a diagram illustrating a tabbed web browser for viewing multimedia content, according to some implementations.

In one implementation, when the user moves browsing tab 310 to the background, the visibility status of browsing tab 310 can change. FIG. 3B illustrates web browser 112, in this situation. In this implementation, a second browsing tab 320 is selected. The user may select tab 320 or switch between browsing tabs using, for example, browser controls 330, using a computer mouse or other pointer device, by tapping the selected tab if user device includes a touch sensitive display, or by some other means. In one implementation, browsing tab 320 displays a different web page 322, which may include text 324 and images 326, 328. Media player 312 remains running in browsing tab 310, which is now in the background. In one implementation, visibility state determining module 204 can update the status of browsing tabs 310 and 320 in tab visibility status information 242.

In one implementation, request responding module 206 can respond to the request for the visibility status of a particular tab. Request responding module 206 can read the current value stored in tab visibility status information 242 for the particular tab and send a response, including the value, to the requestor. In one implementation where the requestor is media server 130, request responding module 206 can send the response over network 140. Request responding module 206 can send an update with the state information of each tab to media server 130 in response to the request, periodically, or each time the status of a tab is updated in tab visibility status information 242.

Figure 4:
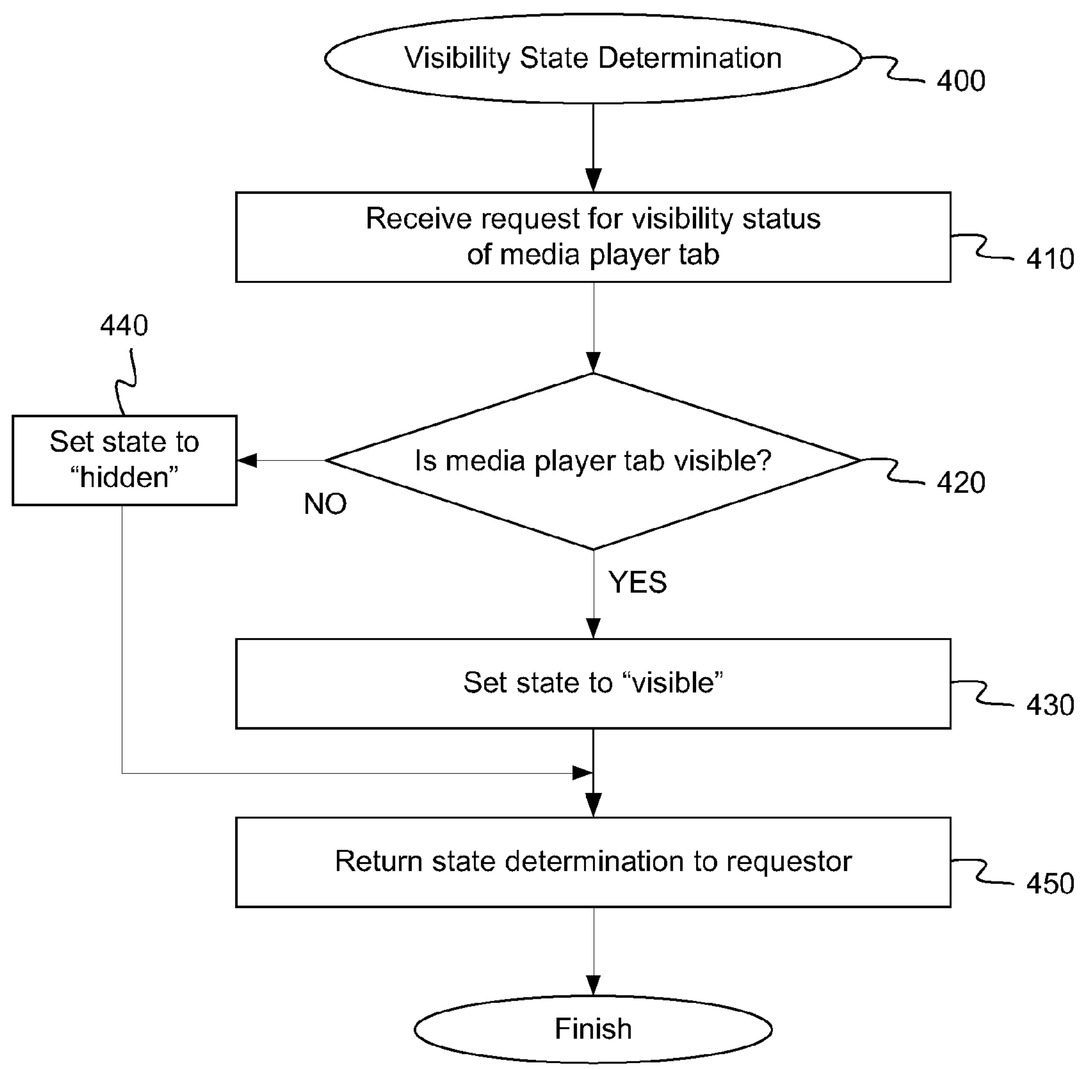
FIG. 4 is a flow diagram illustrating a method for the visibility state of a tab in a web browser, according to some implementations.

FIG. 4 is a flow diagram illustrating a method for the visibility state of a tab in a web browser, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can determine whether a browsing tab containing a media player that is streaming media content is visible to a user of the computing device running the browser. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by visibility monitor 114, as shown in FIGS. 1 and 2.

Referring to FIG. 4, at block 410, method 400 receives a request for visibility status of a media player tab, such as browsing tab 310. In one implementation, request receiving module 202 receives the request, for example, from media server 130. The request may identify the tab 310 of web browser 112 in which a media player 312 is playing streamed media content, such as media file 132. In one implementation, the request is in the form of an API call made, for example, to visibility monitor 114. In one implementation, visibility monitor 114 is the Page Visibility API. Upon receiving the request, request receiving module 202 may forward the request to, or otherwise notify, visibility state determining module 204 that the request has been received from media server 130. In other implementations, the request may be received from some other source besides media server 130.

At block 420, method 400 determines if the media player tab 310 is visible to the user. Visibility state determining module 204 can determine whether the requested tab of web browser 112 is currently visible to the user. Browsing tab 310 may be visible to the user when it is selected, activated, or running in the foreground of web browser 112. Any additional tabs, such as browsing tab 320, are in the background, and the content displayed therein is generally not visible to the user. Visibility state determining module 204 can determine whether each browsing tab is activated or not, and if activated, determine that the browsing tab is visible. If at block 420, method 400 determines that the browsing tab 310 is visible, at block 430, method 400 sets the state value for browsing tab 310 to "visible." If at block 420, method 400 determines that the browsing tab 310 is not visible, at block 440, method 400 sets the state value for browsing tab 310 to "hidden." In one implementation, visibility state determining module 204 can store the value in tab visibility status information 242. Alternatively, the steps at blocks 420 and 430 are not performed in response to block 410. In one implementation, the visibility status is updated by a different process (e.g., every time a different tab is selected) and method 400 will only need to access this information, rather than sending a specific request.

At block 450, method 400 returns the determined state value to the requestor. In one implementation, request responding module 206 can respond to the request for the visibility status of a particular tab. Request responding module 206 can read the current value stored in tab visibility status information 242 for the particular tab and send a response, including the value, to the requestor. In one implementation where the requestor is media server 130, request responding module 206 can send the response over network 140.

Figure 5:
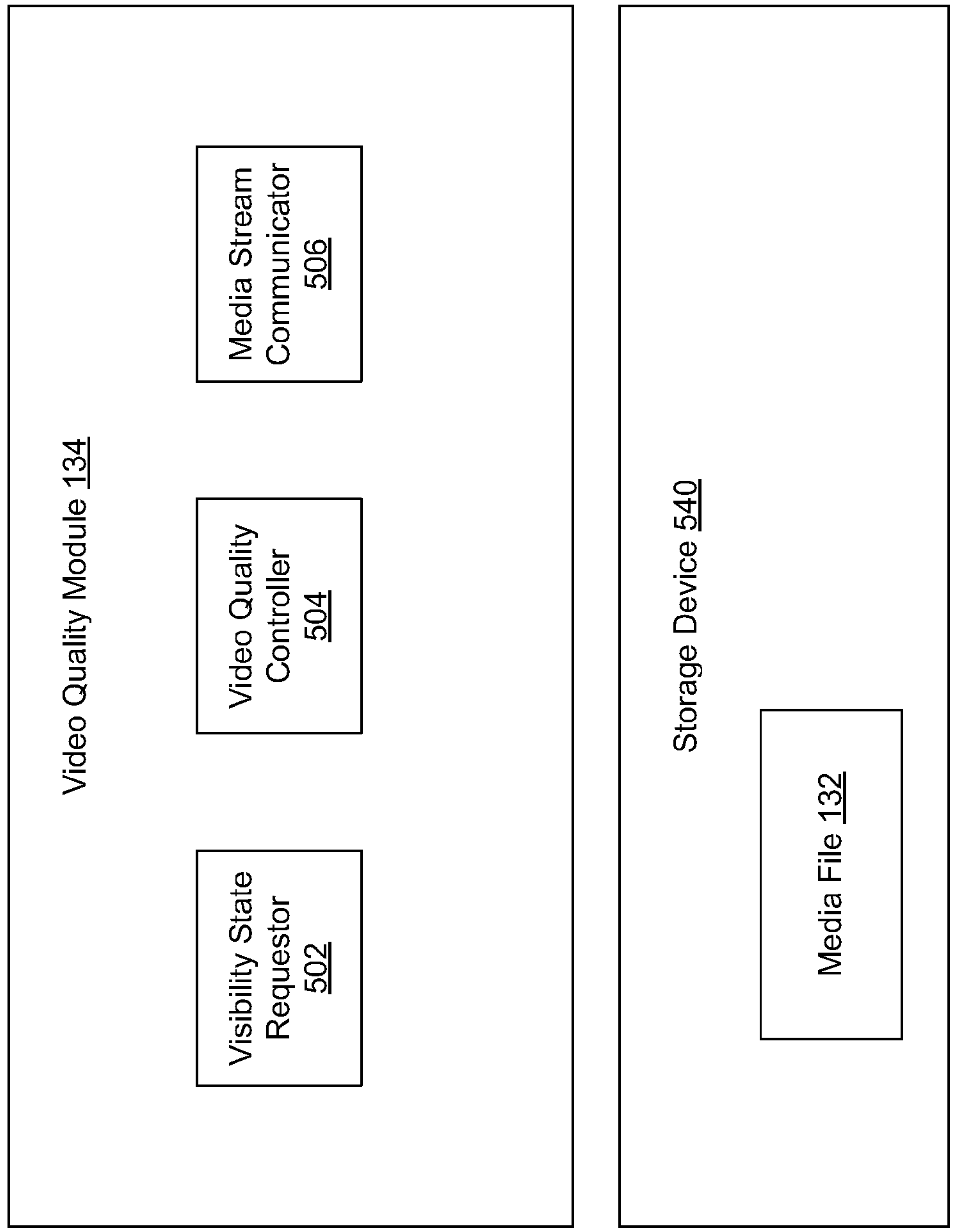
FIG. 5 is a block diagram illustrating a video quality module for dynamically adjusting video quality, according to some implementations.

FIG. 5 is a block diagram illustrating a video quality module for dynamically adjusting video quality, according to some implementations. In one implementation, video quality module 134 includes visibility state requestor 502, video quality controller 504 media stream communicator 506. This arrangement of modules may be a logical separation, and in other implementations, these modules or other components can be combined together or separated in further components, according to a particular implementation. In one implementation, storage device 540 is connected to video quality module 134 and includes media file 132. In one implementation, media server 130 may include video quality module 134 and storage device 540. In another implementation, storage device 540 may be external to media server 130 and may be connected to media server 130 over a network or other connection. In other implementations media server 130 may include different and/or additional components which are not shown to simplify the description. Storage device 540 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, visibility state requestor 502 generates and issues a request to user device 110 for the visibility status of a tab of web browser 112 in which media player 312 is running. The request may specify the particular browsing tab 310 or may be for the status of all tabs in web browser 112. In one implementation, visibility state requestor 502 may repeatedly issue a request at periodic intervals. In another implementation, visibility state requestor 502 may issue the request in response to a command from an administrator or other entity. In response to the request, visibility state requestor 502 can receive a value indicating the visibility status (e.g., "visible" or "hidden") from visibility monitor 114 on user device 110.

In one implementation, video quality controller 504 can dynamically adjust the quality of a video component of media file 132 or halt transmission of the video component completely. In one implementation, media server 130 may be streaming media file 132 to user device 110. If visibility state requestor 502 receives an indication from the user device 110 that the browsing tab 310 containing the media player is not visible to the user, video quality controller 504 may decrease the quality of the media component. For example, video quality controller 504 may reduce the resolution of the video component of media file 132 that is streamed to user device 110. In another implementation, media stream communicator 506 may halt transmission of the video component completely. In either case, the audio component of the streaming media may remain unchanged, so that the user can continue to hear corresponding sound. Similarly, if visibility state requestor 502 receives an indication that the browsing tab 310 has become visible again, video quality controller 504 can increase the quality of the video component of media file 132 back to an original or default quality, or media stream communicator 506 can resume transmission of the video component.

Figure 6:
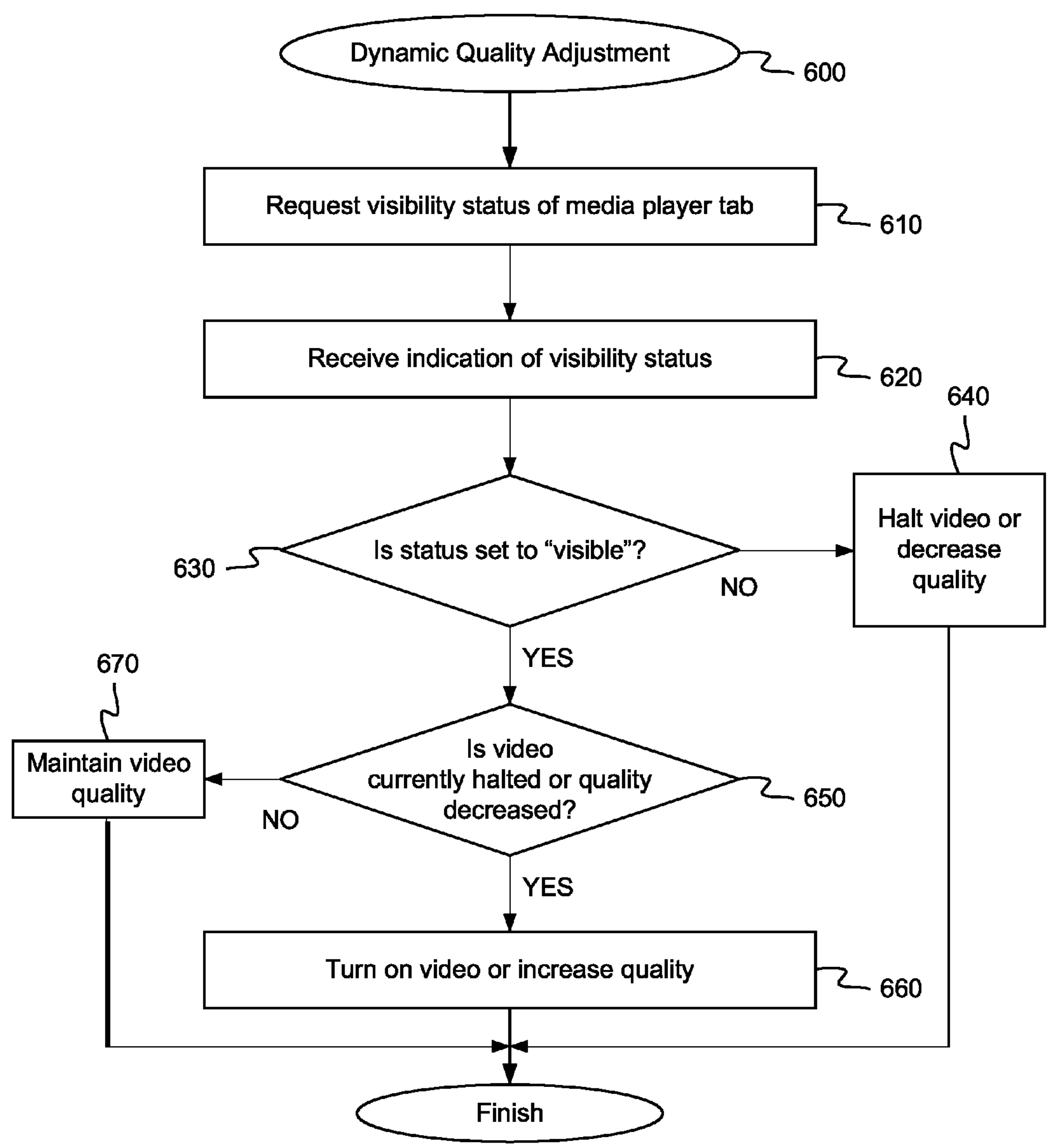
FIG. 6 is a flow diagram illustrating a method for dynamically adjusting video quality, according to some implementations.

FIG. 6 is a flow diagram illustrating a method for dynamically adjusting video quality, according to an implementation of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can dynamically adjust video quality based on whether the streaming video is visible to a user. In one implementation, method 600 may be performed by video quality module 134 as shown in FIG. 1 and FIG. 5.

Referring to FIG. 6, at block 610, method 600 requests the visibility status of a browsing tab 310 of web browser 112 containing media player 312. In one implementation, visibility state requestor 502 generates and issues a request to user device 110 for the visibility status of the browsing tab 310. In one implementation, visibility state requestor 502 may repeatedly issue a request at periodic intervals. In another implementation, visibility state requestor 502 may issue the request in response to a command from an administrator or other entity. In response to the request, at block 620, method 600 receives an indication of the requested visibility state. Visibility state requestor 502 can receive a value indicating the visibility status (e.g., "visible" or "hidden") from visibility monitor 114 on user device 110. Alternatively, user device 110 can provide an update to the visibility status each time the status changes during media streaming.

At block 630, method 600 determines if the received visibility status is set to "visible" or if the received indication otherwise indicates that the browsing tab 310 is active. In one implementation, the visibility status will be set to either "visible" or "hidden." In other implementations, however, some other indication may be provided. If at block 630, method 600 determines that the visibility status is not set to "visible," at block 640, method 600 halts transmission of the video component or decreases the quality of the video. For example, video quality controller 504 may reduce the resolution of the video component of media file 132 that is streamed to user device 110. In another implementation, media stream communicator 506 may halt transmission of the video component completely.

If at block 630, method 600 determines that the visibility status is set to "visible," at block 650, method 600 determines if the video component of media file 132 is currently halted or has the quality currently decreased. In one implementation, the video component of media file 132 may have a default quality setting. This may be for example, the highest resolution supported by user device 110 or some intermediate resolution. In one implementation, the default quality may be set by the user of user device 110. Upon being reduced at block 640, the video quality may be reduced to a lower resolution than the default or standard resolution. Video quality controller 504 may determine what quality setting is currently being used to stream the video component to user device 110. If at block 650, method 600 determines that the video component is currently halted or has had the quality decreased, at block 660, method 600 resumes transmission of the video component or increases the quality back to the default setting. If at block 650, method 600 determines that the video component is not currently halted or has not had the quality decreased, at block 670, method 700 maintains the current video quality (or allows the video to remain halted).

Figure 7:
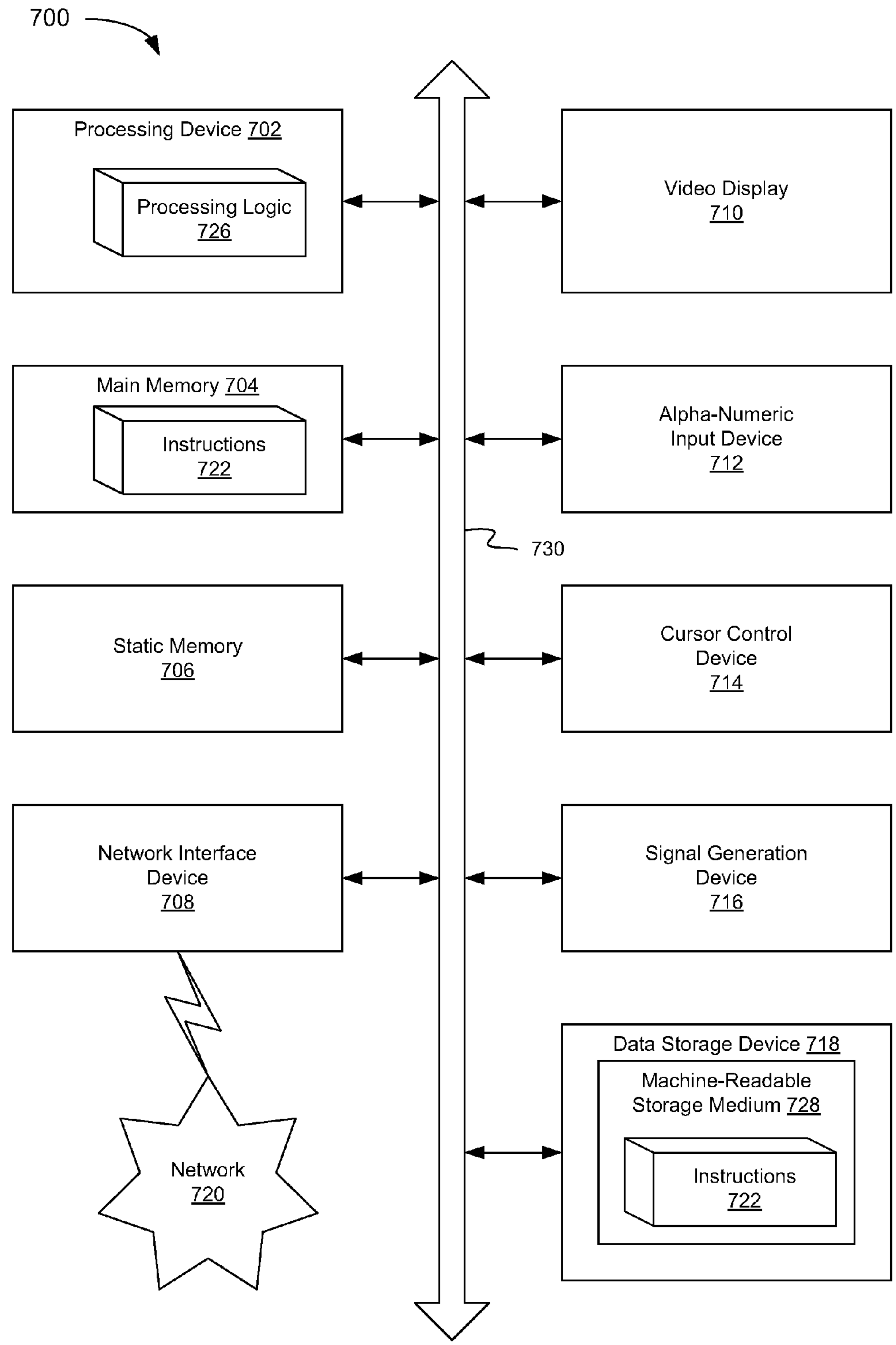
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a server, such as web server 120, or media server 130, running video quality module 134.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for dynamically adjusting video quality, as described herein. While the machine-readable storage medium 728 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:

providing, from a media streaming server, a streaming media file to a streaming media player in a first tab of a plurality of tabs of a user interface running on a user device, wherein a second tab of the plurality of tabs comprises content not including the streaming media player;

receiving, at the media streaming server, data from the user device indicating a visibility status of the first tab of the plurality of tabs in the user interface running on the user device;

determining, based on the data indicating the visibility status of the first tab, whether the first tab of the user interface is currently visible to a user of the user device, wherein the first tab is not visible to the user when the second tab of the plurality of tabs is selected; and if the first tab of the user interface is not currently visible to the user, decreasing, by a processing device of the media streaming server, a quality of a video component of a streaming media file being provided to the user device and playing in the streaming media player, while maintaining a current status of an audio component of the streaming media file.

2. The method of claim 1, wherein the first tab of the user interface is not visible to the user when the first tab is in the background of the user interface, behind one or more other tabs including the second tab.

3. The method of claim 1, further comprising:

halting a transmission of the video component of the streaming media file to the user device; and continuing to transmit an audio component of the streaming media file to the user device.

4. The method of claim 1, further comprising:

if the first tab of user interface is currently visible to the user, determining if the video component is currently decreased from a default setting.

5. The method of claim 4, further comprising:

if the video component is currently decreased from the default setting, increasing the quality of the video component to the default setting; and if the video component is not currently decreased from the default setting, maintaining a current quality of the video component.

6. The method of claim 4, wherein the first tab of the user interface is visible to the user if the first tab is in the foreground of the user interface.

7. The method of claim 1, wherein receiving the data indicating the visibility status of the first tab comprises sending a request for the visibility status of the first tab using a page visibility application programming interface of the user interface.

8. A non-transitory machine-readable storage medium storing instructions which, when executed, cause a processing device to perform operations comprising:

providing, from a media streaming server, a streaming media file to a streaming media player in a first tab of a plurality of tabs of a user interface running on a user device, wherein a second tab of the plurality of tabs comprises content not including the streaming media player;

receiving, at the media streaming server, data from the user device indicating a visibility status of the first tab of the plurality of tabs in the user interface running on the user device;

determining, based on the data indicating the visibility status of the first tab, whether the first tab of the user interface is currently visible to a user of the user device, wherein the first tab is not visible to the user when the second tab of the plurality of tabs is selected; and if the first tab of the user interface is not currently visible to the user, decreasing, by the media streaming server, a quality of a video component of a streaming media file being provided to the user device and playing in the streaming media player, while maintaining a current status of an audio component of the streaming media file.

9. The non-transitory machine-readable storage medium of claim 8, wherein the first tab of the user interface is not visible to the user when the first tab is in the background of the user interface, behind one or more other tabs including the second tab.

10. The non-transitory machine-readable storage medium of claim 8, the operations further comprising:

halting a transmission of the video component of the streaming media file to the user device; and continuing to transmit an audio component of the streaming media file to the user device.

11. The non-transitory machine-readable storage medium of claim 8, the operations further comprising:

if the first tab of user interface is currently visible to the user, determining if the video component is currently decreased from a default setting.

12. The non-transitory machine-readable storage medium of claim 11, the operations further comprising:

if the video component is currently decreased from the default setting, increasing the quality of the video component to the default setting; and if the video component is not currently decreased from the default setting, maintaining a current quality of the video component.

13. The non-transitory machine-readable storage medium of claim 11, wherein the tab of the user interface is visible to the user if the first tab is in the foreground of the user interface.

14. The non-transitory machine-readable storage medium of claim 8, wherein receiving the data indicating the visibility status of the first tab comprises sending a request for the visibility status of the first tab using a page visibility application programming interface of the user interface.

15. A system comprising:

a processing device;

a memory coupled to the processing device; and a video quality module, executable by the processing device from the memory, to:

provide, from a media streaming server, a streaming media file to a streaming media player in a first tab of a plurality of tabs of a user interface running on a user device, wherein a second tab of the plurality of tabs comprises content not including the streaming media player;

receive, at the media streaming server, data from the user device indicating a visibility status of the first tab of the plurality of tabs in the user interface running on the user device;

determine, based on the data indicating the visibility status of the first tab, whether the first tab of the user interface is currently visible to a user of the user device, wherein the first tab is not visible to the user when the second tab of the plurality of tabs is selected; and if the first tab of the user interface is not currently visible to the user, decrease, by the media streaming server, a quality of a video component of a streaming media file being transmitted to the user device and playing in the streaming media player, while maintaining a current status of an audio component of the streaming media file.

16. The system of claim 15, wherein the first tab of the user interface is not visible to the user when the first tab is in the background of the user interface, behind one or more other tabs including the second tab.

17. The system of claim 15, the video quality module further to:

halt a transmission of the video component of the streaming media file to the user device; and continue to transmit an audio component of the streaming media file to the user device.

18. The system of claim 15, the video quality module further to:

if the first tab of user interface is currently visible to the user, determine if the video component is currently decreased from a default setting.

19. The system of claim 18, the video quality module further to:

if the video component is currently decreased from the default setting, increase the quality of the video component to the default setting; and if the video component is not currently decreased from the default setting, maintain a current quality of the video component.

20. The system of claim 18, wherein the tab of the user interface is visible to the user if the first tab is in the foreground of the user interface.

21. The system of claim 15, wherein receiving the data indicating the visibility status of the first tab comprises sending a request for the visibility status of the first tab using a page visibility application programming interface of the user interface.

* * * * *